Sept. 2, 1969   H. J. PARSONS ET AL   3,464,292
INDEXING MECHANISM
Filed March 23, 1967   2 Sheets-Sheet 1
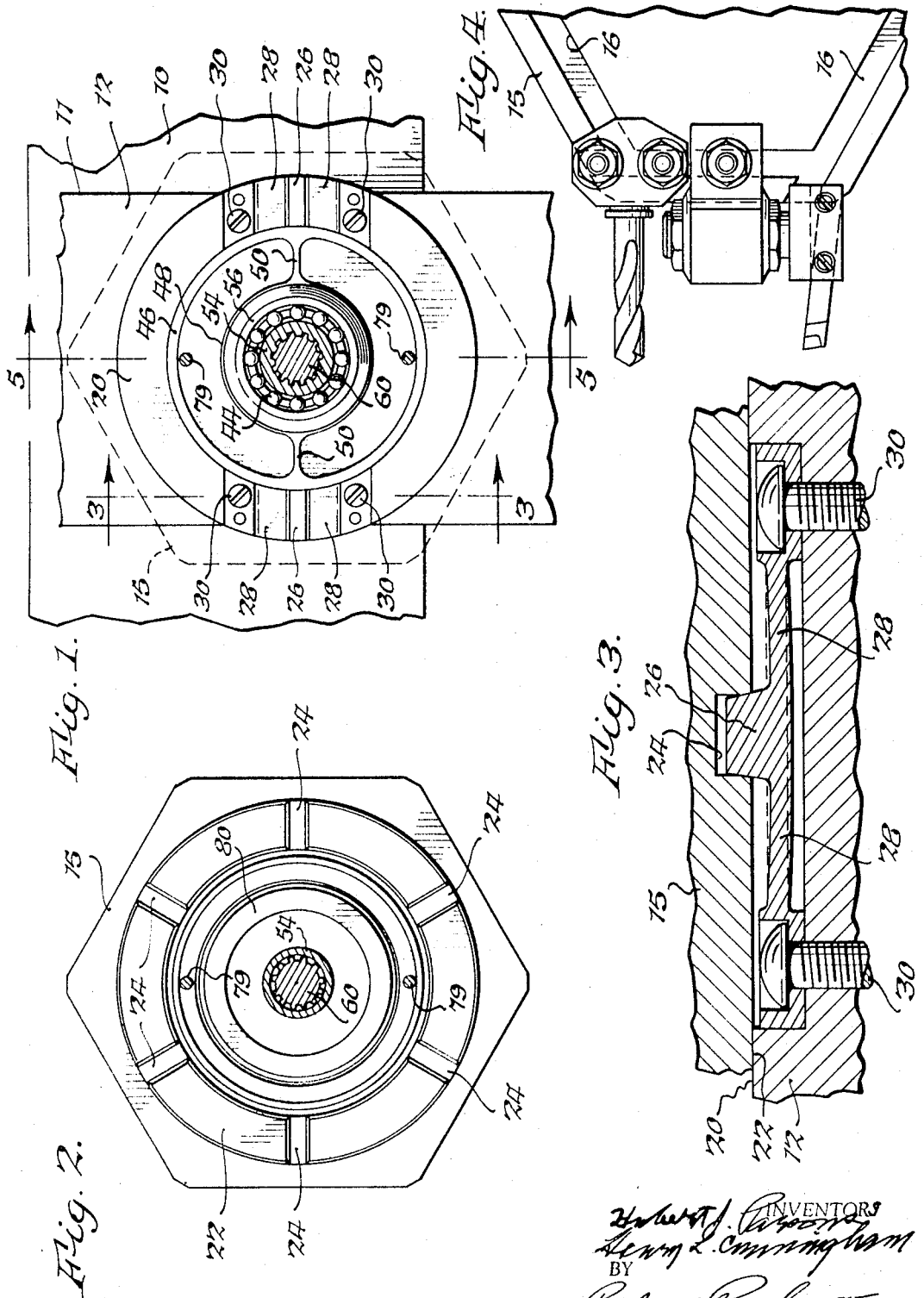
INVENTORS
Hubert J. Parsons
Henry L. Cunningham
BY
Parker & Rochman
ATTORNEYS.

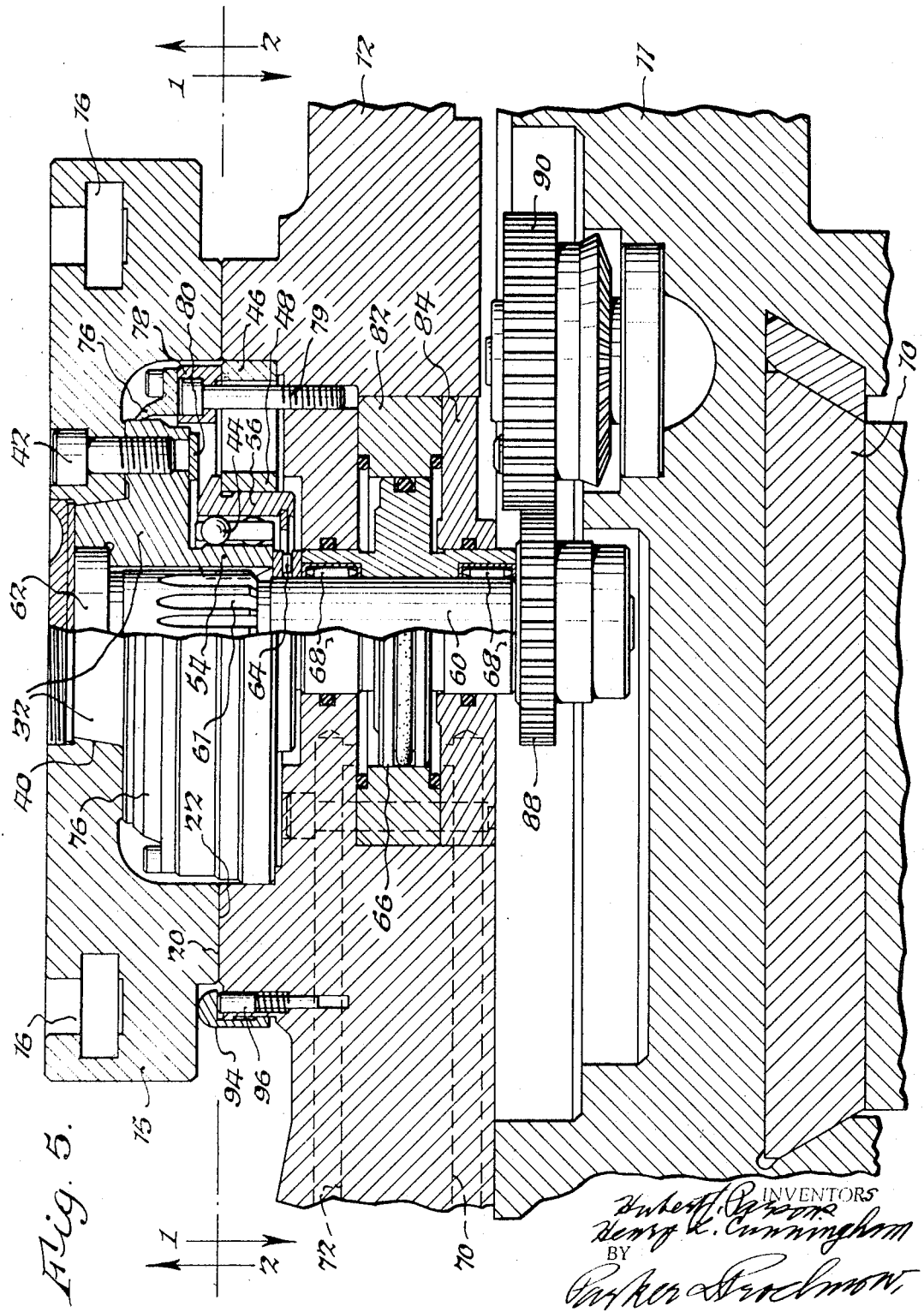

United States Patent Office 3,464,292
Patented Sept. 2, 1969

3,464,292
INDEXING MECHANISM
Hubert J. Parsons and Henry L. Cunningham, Horseheads, N.Y., assignors to Hardinge Brothers, Inc., Elmira, N.Y.
Filed Mar. 23, 1967, Ser. No. 625,450
Int. Cl. B23b 29/30; B23q 17/00
U.S. Cl. 74—826                9 Claims

ABSTRACT OF THE DISCLOSURE

This invention relates to an indexing mechanism for use on turrets of lathes or other machines whereby a high degree of accuracy is obtained in positioning a part with relation to other parts of a machine. This is done by substituting for the large number of teeth heretofore employed and which required special and complex machining to grind these teeth, the means herein disclosed which produces this accurate positioning without requiring the special equipment heretofore necessary, and by providing a pair of teeth mounted to yield in one direction and held against yielding in the direction of movement of the part to be positioned, said teeth having tapered sides and fitting into slots or recesses in the part to be positioned.

---

In the accompanying drawings:

FIG. 1 is a sectional view of our improved indexing mechanism taken on line 1—1, FIG. 5, looking downwardly.

FIG. 2 is a section also on the same section line in FIG. 5, but looking upwardly, as indicated at 2—2.

FIG. 3 is a sectional view on line 3—3, FIG. 1, on an enlarged scale.

FIG. 4 is a fragmentary, top plan view of a part of the indexing mechanism.

FIG. 5 is a central, sectional elevation on an enlarged scale on line 5—5, FIG. 1.

In the drawings we have illustrated our indexing mechanism as applied to a turret used on a lathe but it will be understood that this indexing mechanism may be used on machines or machine parts of other types.

In the drawings, 10 represents the bed of a lathe on which a carriage 11 is mounted to reciprocate. This carriage supports a turret supporting part or base 12 which may be of any usual or suitable construction.

The turret has a tool carrier or top plate 15 which is provided with T-slots 16 or other means for securing tools to the top plate of the turret.

The problem in a machine tool turret is to put the turning, boring or other tool on the turret in exactly the same position relative to the axis of the spindle of the lathe or other machine for each repeat indexing in order to repetitively produce pieces of the same size and shape. Heretofore generally special equipment was required for this purpose and one of the objects of this invention is to obtain this result without requiring special equipment for machining parts of the turret.

The base 12 of the turret is provided with an upwardly extending, annular flange or track 20 which cooperates with a downwardly extending flange or track 22 on the top plate which rests on the flange 20 and the two contacting surfaces of the tracks 20 and 22 being accurately formed so that the top plate 15 can be accurately held relatively to the base 12.

In order to provide means for accurately stopping and holding the top plate 15 relatively to the base 12 for each position of the turret, we have provided on the lower face of the track 22 of the top plate grooves or locating slots 24. In the drawings we have shown a six position turret and consequently six slots of this type are provided. In accordance with our improvement, we have provided only three diametrical slots with the middle portions omitted. Consequently, as will be clear from an inspection of FIG. 2, only three operations are required to produce six slots since only one cutting or grinding operation extending across the top plate is required for each pair of slots. The annular track terminating in the surface 22 of the top plate facilitates the machining of these slots at diametrically opposite surfaces 22 and each pair of slots 24 is ground straight through from one side to the other in one setting of the top plate. This ensures an absolute alinement of the slots or keyways used at any time with each other.

These slots or keyways cooperate with keys or teeth 26 mounted on the base 12. These keys are mounted at diametrically opposite parts of the annular projection or track on which the surface 20 is formed and the keys 26 are mounted in the middle portions of webs or diaphragms 28, the ends of which are suitably mounted on the base by means of screws 30 or the like extending through enlarged parts of the ends of the webs. The middle portions of the diaphragms 28 are made relatively thin so as to be slightly resilient, and the keys have upwardly, slightly converging sides which fit partly into the slots or recesses 24. The diaphragms 28 on which the keys 26 are arranged, because of their structure, may be sprung slightly in one direction, namely perpendicularly to the position shown, or downwardly in FIG. 3, but are held in fixed relation to the base in the direction of the length of the diaphragm 28.

By means of this construction it will be obvious that when the top plate 15 is lowered so that the keys 26 engage in the slots or grooves 24, they are held rigid in a horizontal plane and slightly flexible in a vertical plane. These keys are also ground straight across the base in a single operation so that both keys at once ensure correct positioning of the top plate. The keys are slightly larger than the keyways so that when the contacting areas of the plate and base are in contact, this forces the keys to deflect slightly in a vertical plane. When the top plate is forced down, this ensures a very tight and accurate fit of the top plate on the keys.

This construction ensures repeatability of positioning across the the axis of the keys, and as the keys on the base are placed in line with the axis of the spindle we have provided a system which repeats positioning of the tools on the top in a direction controlling the diameter of work to be turned or bored. By means of this construction it will be obvious that slight wear on the keys or on the edges of the slots 24 will not affect the accuracy of the positioning of the top plate of the turret.

While we have shown the keys on the base and the slots with which the keys cooperate on a top plate, it will be obvious that this arrangement can be reversed with the keys positioned in the top plate and the grooves or slots in the base.

The mechanism for actuating the tool carrier or top plate is such as to permit the slight relative motion of the top plate to the base when these two parts are brought together to correctly position the top plate relatively to the base of the turret. By having the male keys to deflect slightly when the top plate is forced down into its operative position, a tight fit of the keys in the slots is ensured.

The top plate 15 is mounted on a hub 32 in such a manner as to permit the top plate to be removed and replaced on the hub in the same relative position. Any suitable means may be provided for this purpose, such for example, as tapered cooperating surfaces 40, and the top plate is securely fastened to the hub by means of screws 42 which are also accurately formed so that the top plate can be taken off from the hub and put back in the same position on the hub each time. This allows the top plate with the tools mounted thereon to be stored until the same job is to be run again, whereupon the top plate can be placed on the machine without again requiring the tools to be set up. Also a number of top plates can be provided, all of which correctly fit on the hub. This also allows tools to be preset off the machine by locating the tools on the plate, referencing from the keyways and tapered hole in the plate and using a microscope to set the tool points for each station. A fixture is used for this type of presetting which has keys and a tapered mounting post the same as on the machine. The microscope references on the fixture to the center line axis of the spindle and this is held to the same dimension on all machines produced so that the plate with tools can be put on any machine and produce identical parts. The type of tooling to be used will have slight adjustments to compensate for tool wear, but this will be the only thing it will be needed for.

The hub 32 with the top plate secured thereto is mounted for vertical movement, controlled by a slidable and rotatable ball bearing 44 mounted in a support ring having an outer cylindrical part 46 and an inner cylindrical part 48, the two parts being connected by a radially extending web 50 which is thin and slightly flexible which permits the bearing 44 and the center post or shaft 60 supported thereby to float slightly for reasons hereinafter specified. The thin, flexible webs 50 extend parallel to the keys 26, which provides flexibility across the keys and rigidity along the keys. This allows the center post 60 to float slightly so that the keys and the slots 24 may enter into correct relation to each other. The bearing 44 is made by using very accurate balls and is preloaded with an interference fit, so that repeatable accuracy resulting along the axis of the keys 26. This bearing is interposed between a downwardly extending annular sleeve 54 of the hub 32 and a hardened bushing 56 which forms the outer race of the bearing. This bushing is pressed into the inner cylindrical part 48 of the support ring and is tempered to be very hard for the ball bearing, and the support ring is tempered for the flexibility required.

The center post or shaft 60 serves to index the top plate after it has been lifted up to clear the keys 26. This post or shaft is splined to the hub 32 with a loose fitting spline 61 which allows the center post or shaft 60 to remain stationary if the top plate has to move slightly sideways when alining with its keys. The hub 32 is held against vertical movement relatively to the post by means of a flange 62 at the upper end of the post 60 bearing in a shouldered part of the hub and a thrust bearing 64 at the lower end of the sleeve 54 of the hub 32.

The vertical movement of the post 60 is effected by means of hydraulic mechanism including a piston 66 which may be raised by fluid pressure to permit the top plate to rotate for indexing. Needle bearings 68 are provided to allow the post 60 to rotate inside the piston 66. Hydraulic fluid is valved into the cylinder within which the piston is located. When admitted at 70, it raises the piston and the top plate and when admitted at 72 it lowers the top plate. Pressure is maintained at 72 while cuts are being taken, thus clamping the top plate on the surface 20 of the base, and at the same time keeping tension on the diaphragm 28 of the key and on the web 50 of the bearing ring to ensure locating accuracy.

Seal 76 is held in place by means of a ring 78 to exclude foreign matter from the mechanism of the turret when the top plate is removed. This ring 78 also holds the bearing ring in place by being pressed against the outer cylindrical part 46 by means of screws 79. Washer 80 is disposed under the lower ends of the screw holes to keep foreign matter from entering into the mechanism through these screw holes when the top plate is removed.

A bushing 82 is provided which facilitates honing the bore for the piston 66, and 84 is a cap which permits assembly of the piston 66 in the mechanism. O-rings are provided wherever necessary between surfaces to prevent leakage.

Rotation is provided for the post or shaft 60 by means of a gear 88 keyed to the lower end of the shaft and meshing with a gear 90 through which the drive from a suitable indexing mechanism comes. The gear 88 is movable vertically relatively to the gear 90 by providing longer teeth on the gear 90 allowing such movement which will permit the top plate to be lifted clear of the keys 26 before indexing.

Another sealing ring 94 is provided which extends around the base of the turret to keep chips and other foreign material from entering the mechanism along the contact surfaces 20 and 22. A plurality of spring plungers 96 is arranged at intervals on the sealing ring 94 to lift this ring to keep the seal in contact with the top plate when it is lifted to index.

By means of the construction described it will be noted that the friction between tracks 20 and 22 reduces the forces present during the machining operation against the keys 26 and bearing 44. The key 26 engages in the groove 24 slightly before the two contact surfaces of the flanges or tracks 20 and 22 come into contact so that the top plate is very accurately positioned before being pressed against the base for holding these two parts together. It is also an advantage that the holding of the top plate in its indexed position during machining operations is effected by the surfaces of the tracks 20 and 22, the fit of the keys 26 in their grooves 24, and by bearing 44 along the axis of the keys.

The tracks 20 and 22 hold the top plate against tipping forces and the keys and grooves serve to make a final small adjustment in the position of the top plate as well as to hold against rotative forces, and bearing 44 provides rigidity and positioning along the axis of the keys. This results in highly accurate positioning after each index over extended periods of time and use.

It will be noted that the mechanism described for making a turret has resulted in a very rigid and accurate construction which does not require specialized machinery for its manufacture.

It will be understood that various changes in the details, materials and arrangements of parts which have been herein described and illustrated in order to explain the nature of the invention may be made by those skilled in the art with the principle and scope of the invention as expressed in the appended claims.

We claim:

1. An indexing mechanism including a base member and a top plate member adjustable about an axis relatively to said base member for indexing said plate member relatively to said base member, cooperating parts on said members movable into frictional engagement with each other to grip said members in to locked engagement when positioned in indexed relation, and indexing means including teeth on one of said members and grooves on the other member which are positioned to cooperate for final positioning of said top plate member in indexed position, and means for moving said members into final gripping engagement after indexing by said teeth and grooves is completed, each tooth being supported by a diaphragm which is slightly flexible vertically and rigidly held against movement horizontally.

2. An indexing mechanism including:

a base, a top plate rotatable relatively to said base for indexing, a shaft journalled in said base, a hub on said shaft rigidly and removably connected with said top plate, upwardly converging frusto-conical faces on said hub of said top plate whereby said top plate may be lowered into operative position on said hub, said hub and top plate having substantially flat faces extending about said shaft for forming a frictional connection between said top plate and said base, means for moving said shaft vertically for indexing and for moving said top plate into and out of engagement with said base through said flat faces, and indexing means on said flat faces for moving said top plate into correct indexing position about said shaft during movement of said top plate toward said base to engage said flat faces.

3. An indexing mechanism according to claim 2 in which said indexing means include grooves on said top plate and teeth on said base, said grooves and teeth being arranged in pairs located at diametrically opposite sides of said shaft, said teeth being yieldingly mounted to yield parallel to said shaft when said plate is moved toward said base.

4. An indexing mechanism according to claim 2 and including, a splined connection between said shaft and said hub which is sufficiently loose to permit slight movement radially of said hub relatively to said shaft, to permit movement of said top plate by said indexing means.

5. An indexing mechanism according to claim 4 and including a bearing between said base and said hub, a support for said bearing which resiliently supports said hub to permit movement of said bearing in a direction only as determined by said indexing means.

6. An indexing mechanism according to claim 5, said support having two concentric cylindrical parts supported relatively to each other by a diametrically extending web which is resilient in one direction only to permit movement of said hub and top plate by said indexing means.

7. An indexing mechanism including a base member and a top plate member and adjustable about an axis relatively to said base member for indexing said plate member relatively to said base member, cooperating parts on said members movable into frictional engagement when positioned in indexed relation, and indexing means including teeth on one of said members and grooves on the other member which are positioned to cooperate for final positioning of said top plate member in indexed position, means for moving said members into final gripping engagement after indexing by said teeth and grooves is completed, each tooth being supported by a diaphragm which is slightly flexible vertically and rigidly held against movement horizontally, a pair of keys is provided on one of said members at opposite sides of said axis for cooperation with a pair of oppositely positioned grooves on the other of said members, flexible means on which said keys are mounted and which are flexible in a direction parallel to the axis of rotation of said members and held rigidly against movement in the direction of rotation about said axis.

8. An alignment construction for an indexing assembly having a base member and a suporting shaft on which a top plate is rotatably supported, comprising:

a first planar bearing surface on said base member disposed about said shaft and facing said top plate, a second planar bearing surface on said top plate which coacts with said first bearing surface and is supported thereon in tight frictional engagement to give rigid support to said top plate, means for providing reciprocating movement of said base and said top plate toward and away from each other in a direction parallel to the axis of said shaft, one of said bearing surfaces having a plurality of top plate angular positioning slots radially disposed with respect to the axis of said shaft, said slots being grouped in pairs, each pair of slots being disposed on a diametral line passing through said shaft axis, the other of said bearing surfaces having a single pair of positioning slot engaging teeth symmetrically disposed on a diametral line and adapted to fit into a selected pair of positioning slots, the walls of said slots and the sides of said teeth being shaped to provide accurate centering of said teeth in said slots to bring about a self-centering action whereby a selected angular alignment of said top plate is accurately fixed when the pair of slot engaging teeth is seated in a selected pair of top plate positioning slots, and, a pre-loaded ball bearing connects said shaft and said top plate.

9. The alignment construction for an indexing assembly as set forth in claim 8, wherein:

said teeth are disposed in said first bearing surface, and said slots are disposed on said second bearing surface; and said pre-loaded ball bearing is an element of said reciprocating movement means, and permits relative axial movement between the inner and outer races thereof, and said teeth are supported on an elongated flexible web member.

References Cited

UNITED STATES PATENTS

| 3,094,885 | 6/1963 | Flannery et al. | 74—826 |
| 3,209,623 | 10/1965 | Schardt | 77—64 |
| 3,213,722 | 10/1965 | Maglica | 82—36 |
| 3,355,968 | 12/1967 | Sharples | 74—826 |

HALL C. COE, Primary Examiner

U.S. Cl. X.R.

77—64; 82—36